United States Patent
De Winde

(10) Patent No.: US 11,158,061 B2
(45) Date of Patent: Oct. 26, 2021

(54) SYSTEMS AND METHODS FOR SEGMENTING IMAGES

(71) Applicant: Materialise N.V., Leuven (BE)

(72) Inventor: Lio De Winde, Leuven (BE)

(73) Assignee: Materialise N.V., Leuven (BE)

(*) Notice: Subject to any disclaimer, the term of this patent is extended or adjusted under 35 U.S.C. 154(b) by 0 days.

(21) Appl. No.: 16/763,819

(22) PCT Filed: Nov. 13, 2018

(86) PCT No.: PCT/US2018/060715
§ 371 (c)(1),
(2) Date: May 13, 2020

(87) PCT Pub. No.: WO2019/099370
PCT Pub. Date: May 23, 2019

(65) Prior Publication Data
US 2020/0372658 A1  Nov. 26, 2020

(30) Foreign Application Priority Data

Nov. 14, 2017 (NL) ...................................... 2019905

(51) Int. Cl.
*G06T 7/187* (2017.01)
*G06T 7/136* (2017.01)
(Continued)

(52) U.S. Cl.
CPC ................ *G06T 7/187* (2017.01); *G06T 5/30* (2013.01); *G06T 7/11* (2017.01); *G06T 7/136* (2017.01);
(Continued)

(58) Field of Classification Search
CPC ... G06T 7/11; G06T 7/12; G06T 2207/20036; G06T 17/00; G06T 19/00; G06T 2200/04;
(Continued)

(56) References Cited

U.S. PATENT DOCUMENTS 6,366,635 B1 * 4/2002 Op De Beek ........... G06T 15/08
378/4
2003/0184730 A1 * 10/2003 Price ......................... G06T 5/50
356/39
(Continued)

FOREIGN PATENT DOCUMENTS

DE        102017200930 A1 *  7/2018  ............. A61B 6/502

OTHER PUBLICATIONS

Yan Kang et al. Interactive 3D editing tools for image segmentation (Year: 2002).*

(Continued)

*Primary Examiner* — Nizar N Sivji
(74) *Attorney, Agent, or Firm* — Patterson + Sheridan, LLP

(57) ABSTRACT

Embodiments disclosed herein relate to systems and methods for segmenting 2D images. Certain embodiments provide a method of segmenting a 2D image. The method includes obtaining a 2D mask for the 2D image, wherein the 2D mask comprises a portion of the 2D image. The method includes selecting one or more first voxels of the 2D image not part of the 2D mask and adding the one or more first voxels of the 2D image to the 2D mask. The method includes selecting one or more second voxels of the 2D image and performing a morphological closing on one or more third voxels comprising the one or more second voxels of the 2D image that are part of the 2D mask. The method includes performing an automatic flood-fill operation on at least a portion of the 2D mask.

20 Claims, 13 Drawing Sheets

(51) Int. Cl.
*G06T 7/11* (2017.01)
*G06T 7/174* (2017.01)
*G06T 7/155* (2017.01)
*G06T 5/30* (2006.01)

(52) U.S. Cl.
CPC .............. *G06T 7/155* (2017.01); *G06T 7/174* (2017.01); *G06T 2207/20036* (2013.01); *G06T 2207/20104* (2013.01)

(58) Field of Classification Search
CPC ........... G06T 2207/10132; G06T 7/187; G06T 7/136; G06T 7/174; G06T 7/155; G06T 5/30; G06T 2207/20104; G06T 2207/20101
See application file for complete search history.

(56) References Cited

U.S. PATENT DOCUMENTS

| | | | | |
|---|---|---|---|---|
| 2005/0111732 | A1* | 5/2005 | Mallya | A61B 6/00 382/173 |
| 2006/0171578 | A1* | 8/2006 | Novak | G06T 7/30 382/131 |
| 2006/0239554 | A1* | 10/2006 | Sun | G06T 19/00 382/173 |
| 2007/0253609 | A1* | 11/2007 | Aben | G06T 7/149 382/128 |
| 2020/0286240 | A1* | 9/2020 | Ouji | G06T 7/174 |

OTHER PUBLICATIONS

Jayaram K Udupa—Fuzzy Connectedness and Object Definition: Theory, Algorithms, and Applications in Image Segmentation (Year: 1996).*

Automatic Detection of Brain Contours in MRI Data Sets (Year: 1993).*

Automatic Lung Segmentation in CT Images with Accurate Handling of the Hilar Region (Year: 2011).*

Space-Variant Computer Vision: A Graph-Theoretic Approach (Year: 1999).*

Hoad, CL et al., Measurement of gastric meal and secretion volumes using magnetic resonance imaging, Physics in Medicine & Biology, Institute of Physics and Engineering in Medicine, vol. 60:3, Jan. 16, 2015, pp. 1367-1383, XP020277769, ISSN: 0031-9155, DOI: 10.1088/0031-9155/60/311367.

Kang Yan et al., Interactive 3D editing tools for image segmentation, Medical Image Analysis, vol. 8:1, Mar. 1, 2004, pp. 35-46, XP002607361, ISSN: 1361-8415, DOI: 10.1016/J.MEDIA.2003.07.002.

Ropers, S. O. et al., Automatic Scene Comparison and Matching in Multimodal Cytopathological Microscopic Images, Image Processing, 2005, ICIP 2005, IEEE International Conference on, IEEE, Piscataway, NJ, USA, IEEE , vol. 1, Sep. 11, 2005, pp. 1145-1148, XP010851026, DOI: 10.1109/ICIP.2005.1529958, ISBN: 978-0-7803-9134-5.

* cited by examiner

SYSTEMS AND METHODS FOR SEGMENTING IMAGES

CROSS-REFERENCE TO RELATED APPLICATIONS

This application claims the benefit of Dutch Patent Application No. 2019905, filed Nov. 14, 2017. The content of the application is hereby incorporated by reference in its entirety.

BACKGROUND

Field of the Invention

This application relates to digital imaging. More particularly, this application relates to systems and methods for segmenting 2D digital images.

Description of the Related Technology

Images (e.g., medical images), such as computed tomography (CT) images, X-ray images, and/or magnetic resonance imaging (MRI) images, are often used as input to create three-dimensional (3D) models of one or more objects visible in the images, such as anatomical parts (e.g., including tissue, bone, etc.) visible in the images. Such images may include a stack of two-dimensional (2D) images. It should be noted that 2D images and 3D models as discussed herein may refer to digital images and models that may be digital representations of objects unless otherwise noted. Each 2D image may correspond to a slice or planar intersection of a plane and the one or more objects. The 2D image may include pixels with different grey values. For example, different portions of the image may include pixels with different greyscale values representing parameters at that location in the image. Such parameters may include a density of material, type of material, functional activity, fluid flow rate, etc., in the location. For example, the image may have different greyscale values for pixels at different locations, such as locations with an object, locations without an object, locations with different types of objects, etc. Accordingly, different objects (e.g., anatomical parts) can be identified by the differences in grey values in the 2D images. Since the 2D images are stacked, each pixel in a 2D image may also represent a voxel in 3D space.

Though certain embodiments are described as 2D images including greyscale values for pixels, the images may similarly include color values for pixels. In such embodiments, different portions of the image may include pixels with different color values (e.g., hue, lightness, and/or saturation) representing parameters at that location in the image. For the sake of clarity, the application will describe 2D images as including greyscale values, but any person skilled in the art will understand that the same techniques described herein apply for color values as well.

For example, a 3D model of a patient's anatomy (e.g., anatomical surface) may be created from such 2D images. In some embodiments, construction of the 3D model of a patient's anatomy may begin with scanning a patient. Scanning may include using a scanning technique that generates the images. The output of the scan may include a stack of 2D images corresponding to 2D slices forming a 3D data set. The output of the scan may be digitally imported into a computer program running on a computing device and may be converted to a 3D model of an object using image-processing algorithms known in the field of image processing technology. For example, the virtual 3D model may be constructed from the data set using a computer program such as Mimics™ as supplied by Materialise N.V., Leuven, Belgium.

In order to create a 3D model of one or more particular objects imaged from a stack of 2D images, it may be necessary to distinguish for every 2D image in the stack between the parts of the 2D image that correspond to the one or more particular objects, and the parts of the 2D image that do not correspond to the one or more particular objects (e.g., correspond to empty space, other objects, etc.). In particular, only the parts of the 2D image that correspond to the one or more particular objects should be contained in the volume of the 3D model of the one or more particular objects and other parts of the 2D image should not be contained in the volume of the 3D model. The process of distinguishing between such parts of a 2D image is referred to as segmentation.

Segmentation may be performed by creating a 2D mask for every 2D image of the stack (e.g., a separate 2D mask for every 2D image of the stack) indicating the parts that correspond to the one or more particular objects. The 2D mask may be data defining a boundary or area in the 2D image that corresponds to the one or more particular objects. The 2D masks of the 2D images of the stack, accordingly, form a stacked mask that contains a segment or portion of the stack of 2D images that corresponds to the one or more particular objects. The 3D model of the one or more particular objects may then be created as an outer hull (e.g., outer surface area) of the stacked mask. In certain aspects, the outer hull is created using known techniques such as a marching cubes algorithm.

DETAILED DESCRIPTION OF CERTAIN INVENTIVE EMBODIMENTS

Figure 1:
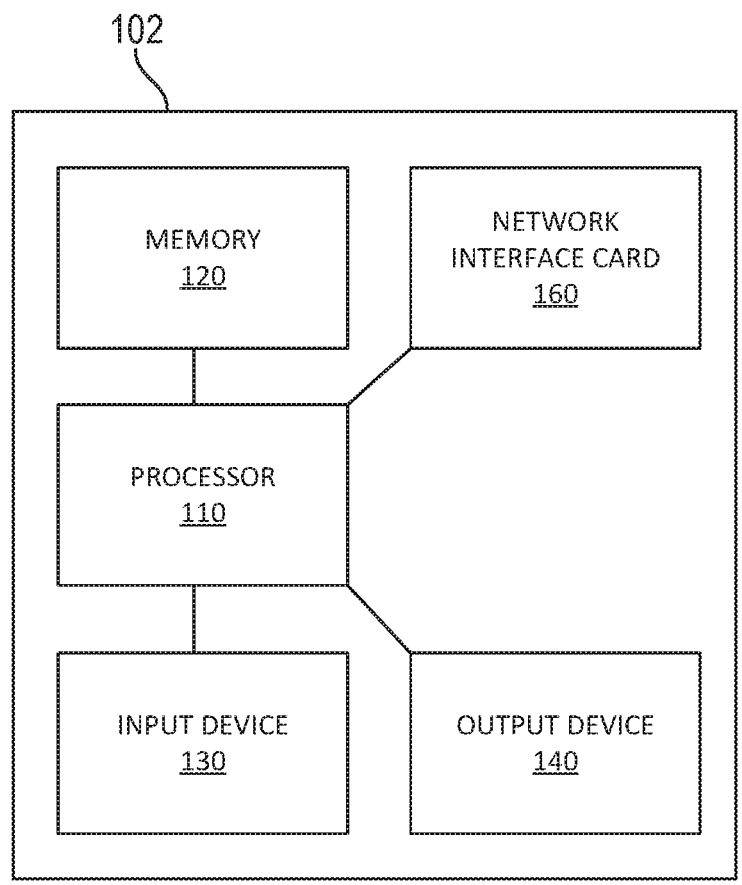
FIG. 1 illustrates a functional block diagram of an example of a computer configured to perform techniques for segmenting 2D images, in accordance with certain embodiments.

Embodiments disclosed herein relate to systems and methods for segmenting 2D digital images. Such systems may include computing devices configured to perform methods for segmenting 2D digital images, and such methods may be performed by such computing devices.

As discussed, a computing device may be used to generate a 3D model of one or more objects (e.g., anatomical parts) from a stack of 2D images of the one or more objects generated using an imaging device (e.g., CT scan, MRI, X-ray, etc.). In particular, 2D masks may be generated for the 2D images, as discussed, the 2D masks forming a stacked mask. The 3D model may be created as an outer hull of the stacked mask. As referred to herein, a 2D mask is a mask that indicates a segment of a 2D image, and a stacked mask is a stack of 2D masks that indicates a segment of a stack of 2D images. 2D images and 2D masks may comprise pixels. However; in the context of 3D operations, including stacked images or stacked masks, such pixels may be referred to as voxels, and the terms pixels and voxels may be used interchangeably.

When creating a 2D mask or stacked mask, a computing device may first perform a greyscale thresholding operation. In such an operation, an upper threshold/limit and a lower threshold/limit of a greyscale window may be defined (e.g., automatically by the computing device based on statistical analysis of the 2D images, or by a user of the computing device). Any pixels in each of the 2D images with a greyscale value within the window (e.g., below the upper threshold and above the lower threshold) may initially be defined as part of a 2D mask of the corresponding 2D image.

One problem when segmenting 2D images is that the 2D images may include noise and variations of greyscale values of pixels over the stack of 2D images. Both the noise (e.g., within each 2D image), and the variation in greyscale values (e.g., both within and between different 2D images) can make it difficult to define a good greyscale window (e.g., upper and/or lower threshold) without selecting too few or too many pixels in the 2D images. For example, noise can lead to pixels that belong to the part that needs segmenting (i.e., pixels corresponding to the part for which the 3D model is to be made) to have greyscale values that fall outside the greyscale window, resulting in those pixels not being incorporated in a 2D mask. Greyscale value variations over the stack of 2D images may mean that a threshold (e.g., upper and/or lower) appropriate for one or a part of one 2D image is not appropriate for another 2D image or another part of the same 2D image.

In certain aspects, the user of the computing device may select a smaller greyscale window (e.g., a lower value for the upper threshold and/or a higher value for the lower threshold), resulting in an incomplete stacked mask, and subsequently manually add any missing pixels to the stacked mask. Different software applications may include different tools, such as flood filling, region growing, interpolation between 2D masks, etc. However, even with such tools, correcting a stacked mask remains a very labor-intensive task for a user of the computing device.

For example, sometimes a 2D mask of a stacked mask may include a closed cavity, meaning there is a hole or area in the 2D mask that does not include pixels, but that is surrounded by pixels to form a closed polygon. Such a closed cavity normally means that the pixels of the closed cavity should be included in the 2D mask as they are likely part of the object. Accordingly, a simple flood-fill tool can be used on a computing device that fills/adds pixels to the 2D mask corresponding to the closed cavity. In certain embodiments, a user may select one or more pixels in the cavity in the 2D mask and select a flood-fill operation to be performed. The computing device may then add the selected one or more pixels to the 2D mask, and then add any neighboring/adjacent pixels to the one or more pixels to the 2D mask that are not part of the 2D mask, and iteratively the neighbors of the neighbors, and so on, until the computing device reaches neighboring pixels that already belong to the 2D mask. Accordingly, the closed cavity can be filled and added to the 2D mask. In certain embodiments, an automatic flood-fill tool running on the computing device may detect closed cavities and fill them automatically according to an automatic flood-fill operation.

Though certain embodiments are described with respect to closed cavities in 2D masks, similar techniques may be applied to a stacked mask, where 3D holes are detected and filled in a similar fashion across multiple 2D masks.

Such manual and automatic flood-fill tools may not work, however, for filling open cavities in the 2D masks/stacked mask. For example, an open cavity may correspond to a hole or area in the 2D mask that does not include pixels, but that is surrounded by pixels to form an open polygon. For example, some number of pixels may not be included in the 2D mask, such that the cavity is open instead of closed. Some such open cavities may still include pixels that should be included in the 2D mask as they are likely part of the object. However, for example, automatic flood-fill tools may not be designed to identify such open cavities as cavities, and other flood-fill tools may fill too many pixels when used with such open cavities.

Accordingly, embodiments herein present systems and methods for segmenting 2D images that can be used to fill open cavities in 2D masks/a stacked mask. These embodiments improve the field of digital imaging, a field necessarily rooted in computing devices, by providing techniques to identify and fill open cavities for segmenting 2D images, thereby reducing the time and complexity in digitally segmenting 2D images using a computing device. In certain aspects, such systems and methods need not be operated or performed by a medical practitioner, and instead may be operated or performed by any technician, engineer, other skilled person, or individual capable of using a computing device.

FIG. 1 illustrates a functional block diagram of an example of a computer configured to perform techniques for segmenting 2D images described herein. The computer 102 includes a processor 110 in data communication with a memory 120, an input device 130, and an output device 140. In some embodiments, the processor is further in data communication with an optional network interface card 160. Although described separately, it is to be appreciated that functional blocks described with respect to the computer 102 need not be separate structural elements. For example, the processor 110 and memory 120 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 also may be coupled to an input device 130 and an output device 140 for, respectively, receiving input from and providing output to a user of the computer 102. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 110 further may be coupled to a network interface card 160. The network interface card 160 prepares data generated by the processor 110 for transmission via a network according to one or more data transmission protocols. The network interface card 160 also decodes data received via a network according to one or more data transmission protocols. The network interface card 160 can include a transmitter, receiver, or both. In other embodiments, the transmitter and receiver can be two separate components. The network interface card 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 2:
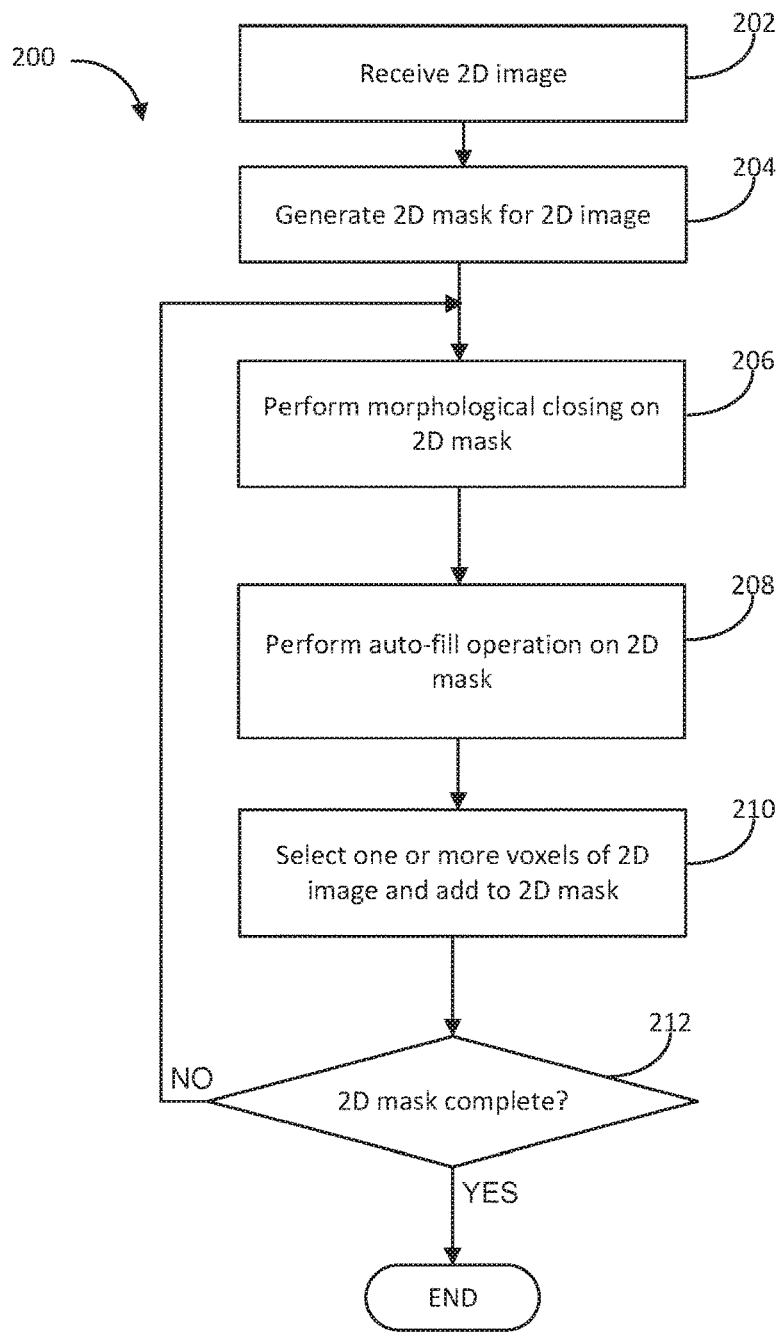
FIG. 2 illustrates an example of a process for segmenting 2D images, in accordance with certain embodiments.

FIG. 2 illustrates an example of a process 200 for segmenting 2D images, in accordance with certain embodiments. Process 200 may be performed by one or more suitable computing devices such as computer 102. Though process 200 is described as being performed in a single plane of the imaged object or on a single 2D image, it should be noted that process 200 (or certain operations of process 200) may be performed on multiple 2D images of a stack of 2D images (e.g., some or all 2D images of a stack of 2D images). Further, it should be noted that the single plane may be a plane of the 2D image, parallel to the plane of the 2D image, or have any orientation in 3D space. For example, in some embodiments, the computing device is configured to perform the process 200 on original 2D images from an imaging device. In some embodiments, the computing device is configured to perform the process 200 on reconstructed 2D images. In some embodiments, the computing device is configured to perform the process 200 on reconstructed 2D images parallel to two planes that are perpendicular to each other and to the plane of the original 2D images.

Figure 2A:
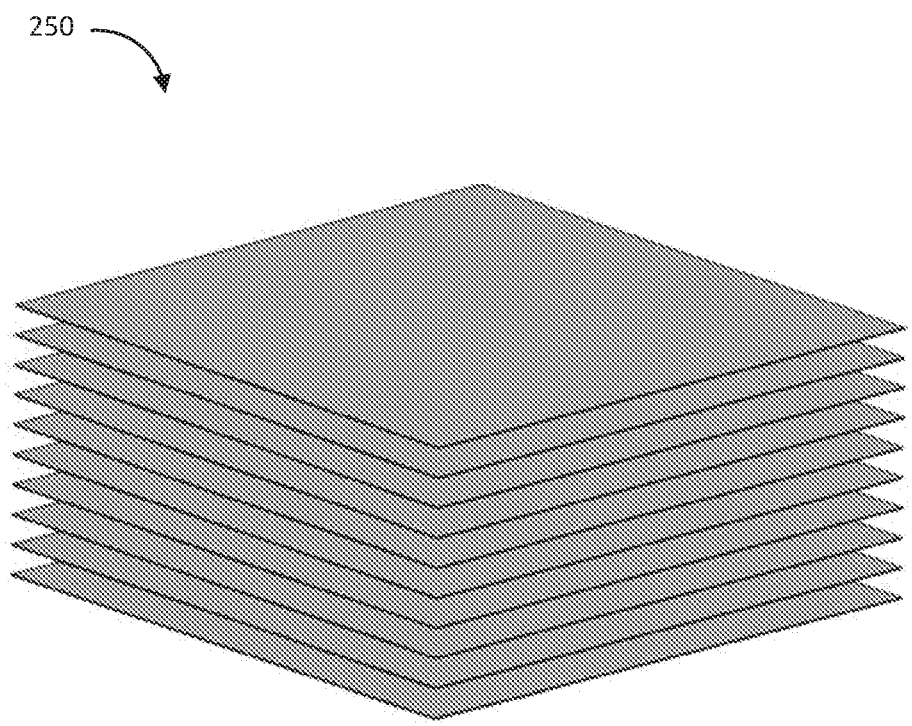
FIGS. 2A-2E illustrate an examples of a stack of 2D images that may be obtained for an object, in accordance with certain embodiments.
Figure 2B:
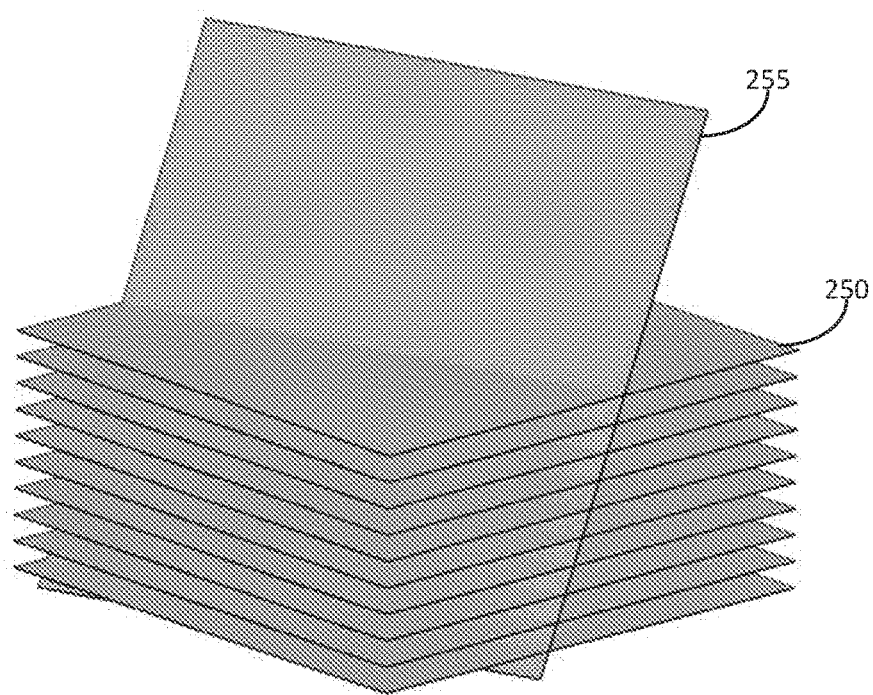
Figure 2C:
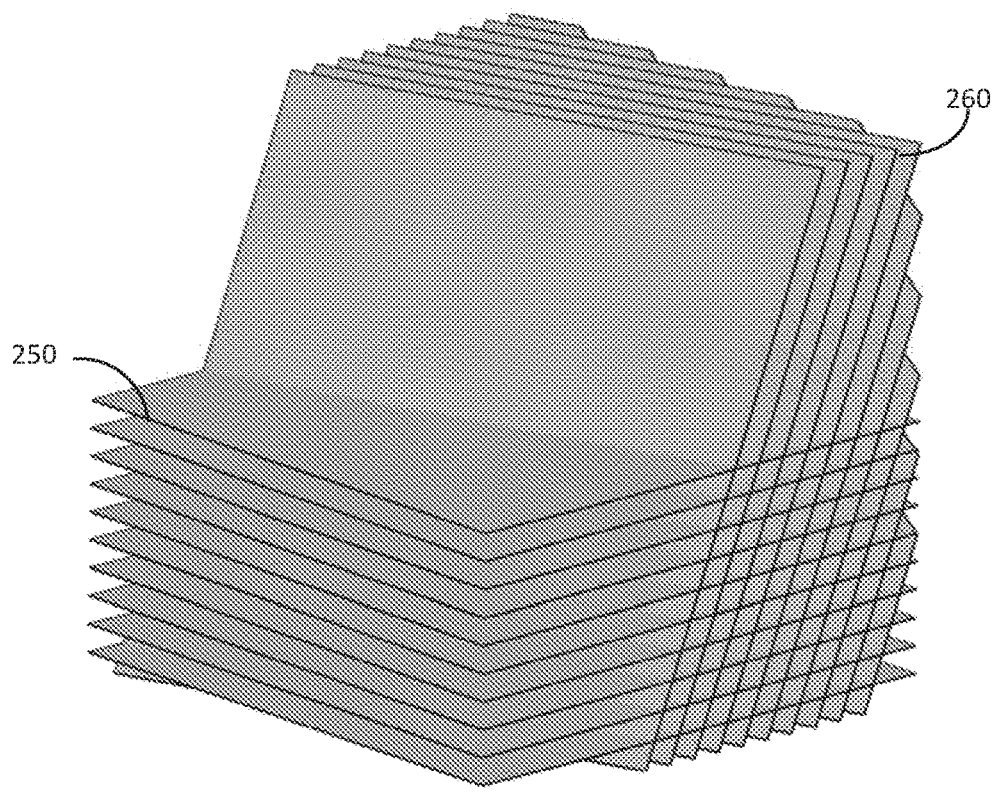

For example, FIG. 2A illustrates an example of a stack of 2D images 250 that may be obtained for an object. In certain embodiments, as discussed, each pixel in each 2D image of the stack of 2D images 250 represents a voxel in 3D space. In certain embodiments, the 3D space represented by the stack of 2D images 250 may be resliced, meaning a new orientation is chosen and a new stack of images generated. For example, FIG. 2B illustrates the stack of 2D images 250 being resliced using a plane 255 that is in a different orientation than the 2D images of the stack of 2D images 250. A new 2D image is generated that includes the voxels from the intersection of plane 255 and the stack of 2D images 250. In some cases, the intersection of plane 255 and the stack of 2D images 250 may be between voxel locations in the stack of 2D images 250, and accordingly an interpolation of the greyscale values of such voxels and/or other neighboring voxels may be used to generate a greyscale value at the intersection for the new 2D image. Several planes parallel to plane 255 may also be used to reslice the stack of 2D images 250 and generate a new stack of 2D images 260 as shown in FIG. 2C.

Figure 2D:
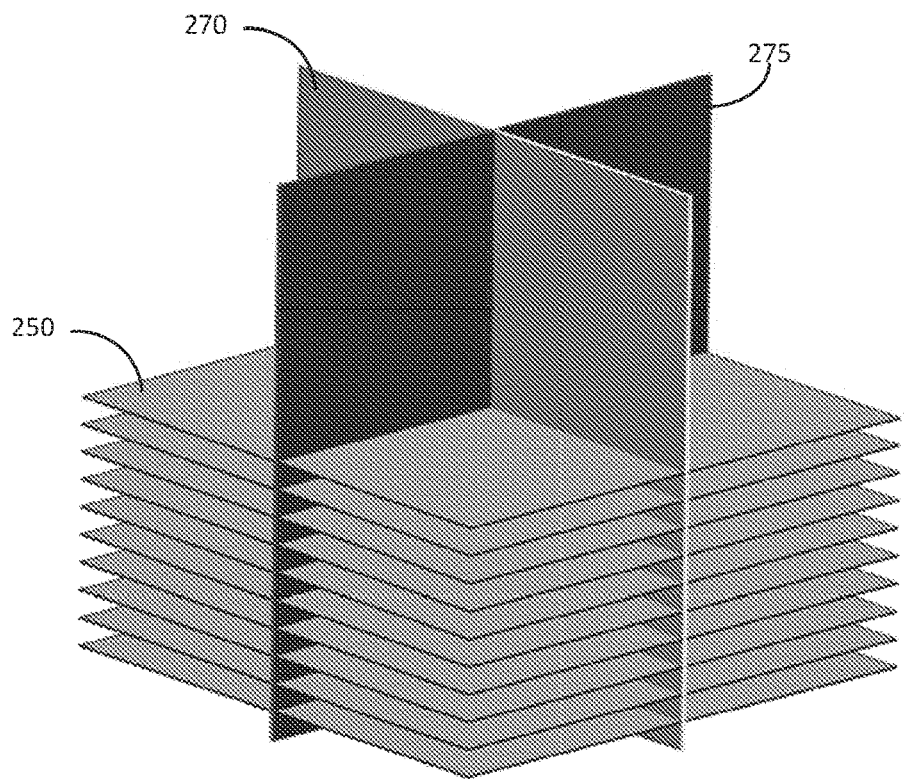
Figure 2E:
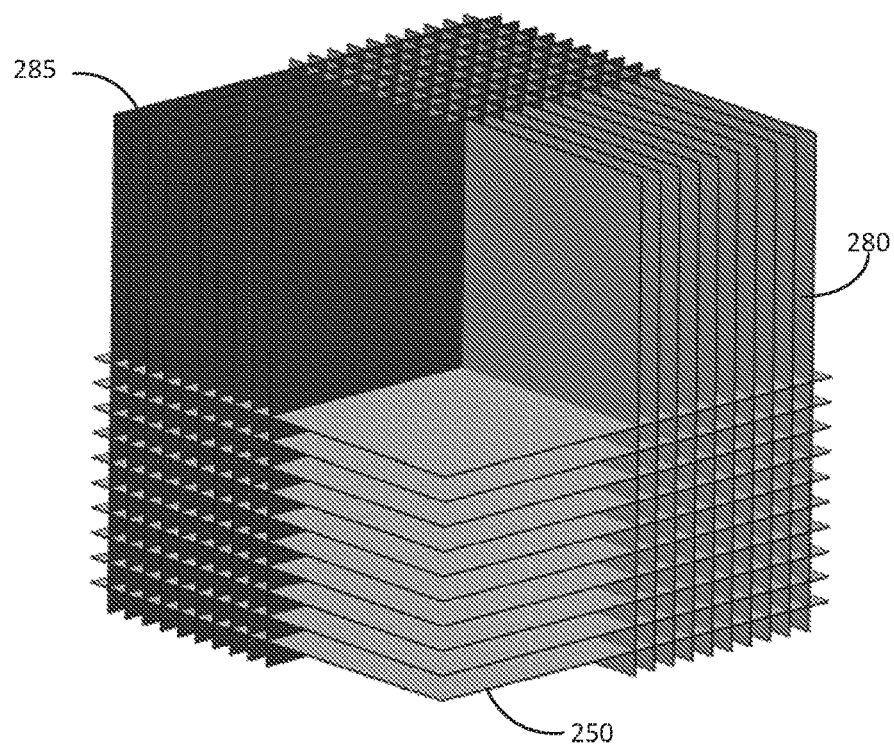

In certain embodiments, as shown in FIGS. 2D and 2E, perpendicular planes 270 and 275 (and planes parallel to them) are used to reslice the stack of 2D images 250 into stacks of 2D images 280 and 285, respectively, such as to generate stacks of 2D images from different orientations. For example, the original stack of 2D images 250 may be an axial image of an object, and the stacks of 2D images 280 and 285 may correspond to sagittal and coronal images of the object, respectively.

It should be noted that if a given operation of process 200 is performed on a single image or in a single plane, it typically affects one 2D mask corresponding to the single image/plane. If a given operation of process 200 is performed on multiple images or in multiple planes, it typically affects multiple 2D masks corresponding to the multiple images/planes.

Optionally, at 202, the computing device receives one or more 2D images (e.g., a stack of 2D images). For example, the computing device may be coupled to an imaging device and receive the one or more 2D images from the computing device directly, or may receive the one or more 2D images from another device (e.g., over a network, flash drive, etc.). In certain embodiments, the received one or more 2D images may be displayed to a user on a display of the computing device.

Figure 3A:
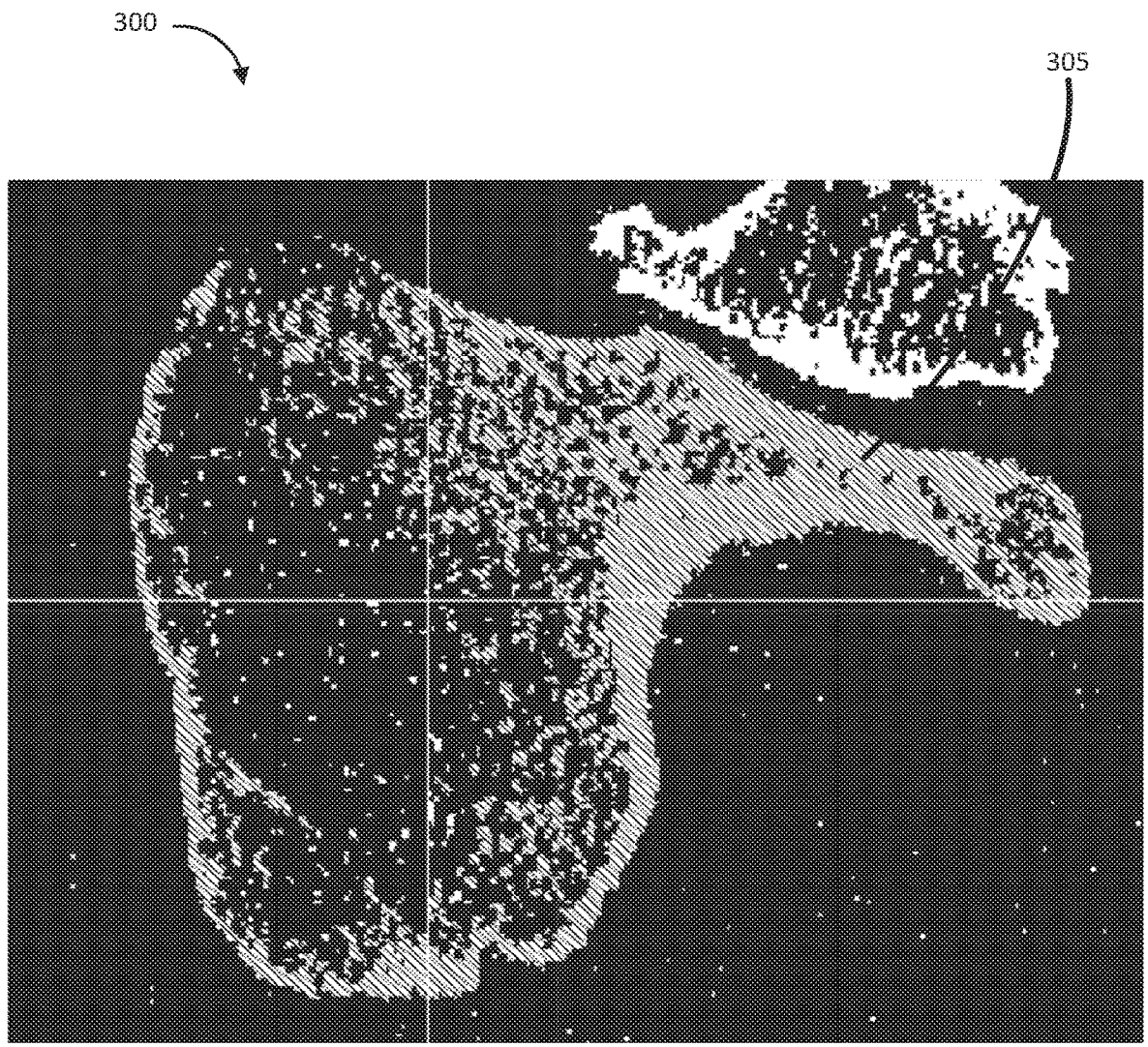
FIGS. 3A-3H illustrate examples of 2D images overlayed with 2D masks, in accordance with certain embodiments.

Optionally, at 204, the computing device generates one or more 2D masks for the one or more 2D images based on a greyscale window defined in the computing device. For example, FIG. 3A illustrates an example of a 2D mask 305 superimposed on a 2D image 300. In certain embodiments, the one or more 2D masks may be displayed to a user on a display of the computing device. It should be noted that in FIGS. 3A-3H, single hatching represents a pre-existing mask, double hatching represents an area added to the mask, and black and white represent greyscale pixels of a medical image. In certain embodiments, the computing device may obtain (e.g., from another source) data (e.g., a file) including one or more 2D images and one or more 2D masks for the one or more 2D images. At 206, a morphological closing is performed on at least one of the one or more 2D masks. In some embodiments, a morphological closing is a known imaging operation where voxels in the 2D mask are dilated over a given number of voxels (e.g., the value of each voxel is set to the maximum value of all the voxels within a distance corresponding to the given number of voxels from the given voxel) and then eroded over the given number (e.g., the same number as for the dilation) of voxels (e.g., the value of each voxel is set to the minimum value of all the voxels within a distance corresponding to the given number of voxels from the given voxel). Dilation over a number of voxels may mean that the boundary of the 2D mask is expanded in all directions over that number of voxels. For example, any voxels that lie within the number of voxels from the 2D mask are also included in the 2D mask. Erosion may be the opposite. In particular, any voxels that are within the number of voxels from the area not belonging to the 2D mask are removed from the 2D mask. A morphological closing may close holes or cavities (e.g., open and/or closed) in the 2D mask that are smaller than or equal to twice the given number of voxels over which the morphological closing is performed. In certain embodiments, the results of the morphological closing on the 2D mask may be displayed to a user on a display of the computing device. For example, the user may preview the results of the morphological closing and manually approve of the results and add the voxels to the 2D mask or manually disapprove of the results and not add the voxels to the 2D mask. As discussed, the morphological closing may be performed on multiple 2D masks of a stacked mask. It should be noted that similar previewing of the results of an operation of FIGS. 2 and/or 4 and/or manually approving of the results may be performed for one or more other operations of FIGS. 2 and/or 4, and/or at the end of process 200 and/or 400. In certain aspects, the preview may be generated by performing the operation on a copy of the mask first, showing the result, and then the waiting for approval of disapproval. If approved, the copy may replace the original mask, or the operation may be performed on the original. If not approved, the copy may be discarded.

Figure 3B:
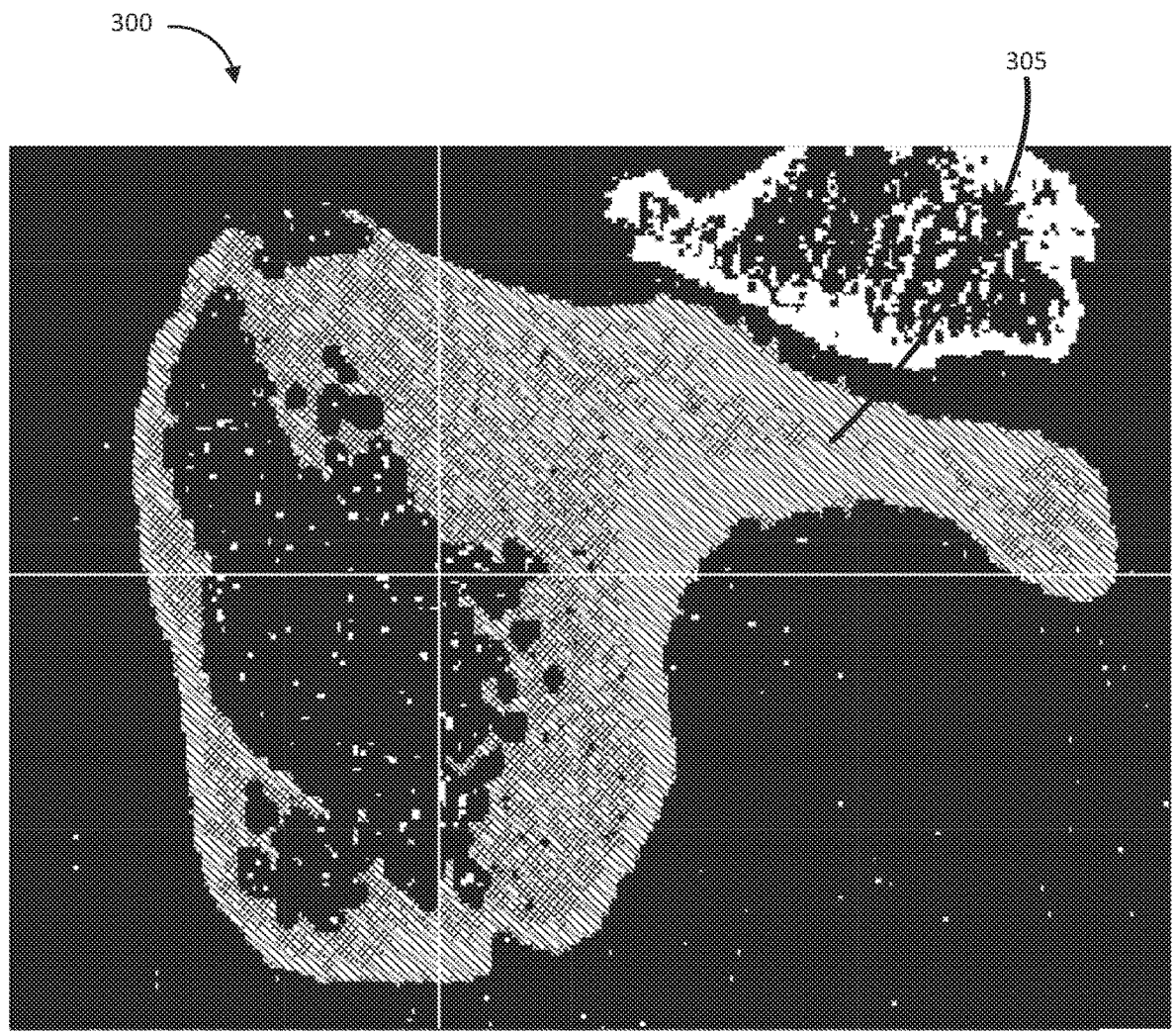

At 208, the computing device performs an automatic flood-fill operation on at least one of the one or more 2D masks (e.g., the same or different as in operation 206). Accordingly, all closed cavities (including now closed cavities that were open cavities prior to operation 206) are added to the 2D mask. In certain embodiments, the results of the automatic flood-fill operation on the 2D mask may be displayed to a user on a display of the computing device. For example, FIG. 3B illustrates 2D mask 305 after the morphological closing and automatic flood-fill of operations 206 and 208.

At 210, a user, using the computing device, can manually select (e.g., using a cursor in a GUI) one or more voxels of 2D image(s) corresponding to at least one of the one or more 2D masks (e.g., the same or different as in operation 206 and/or 208) to be added to the 2D corresponding 2D mask(s). In certain embodiments, adding additional voxels may lead to one or more additional open cavities being closed.

At 212, the computing device determines if the one or more 2D masks are complete (e.g., based on a user indication on the computing device). If the one or more 2D masks are complete the process 200 ends. If the one or more 2D masks are not complete, the process 200 returns to 206 so additional voxels may be added to the one or more 2D masks.

According to process 200, cavities in one or more 2D masks can be efficiently eliminated. However, process 200 may lead have a great deal of computational complexity due to operations 206 and 208 being repeatedly performed, thereby utilizing significant computing cycles, which may slow down the process and lead to inefficiencies in the computing device. Accordingly, certain embodiments described herein provide for more efficient techniques for segmenting 2D images. Such embodiments may beneficially improve the computing device itself by reducing the number of computing cycles and computations needed to segment 2D images, thereby speeding up the process, reducing power consumption, increasing efficiency, etc.

Figure 4:
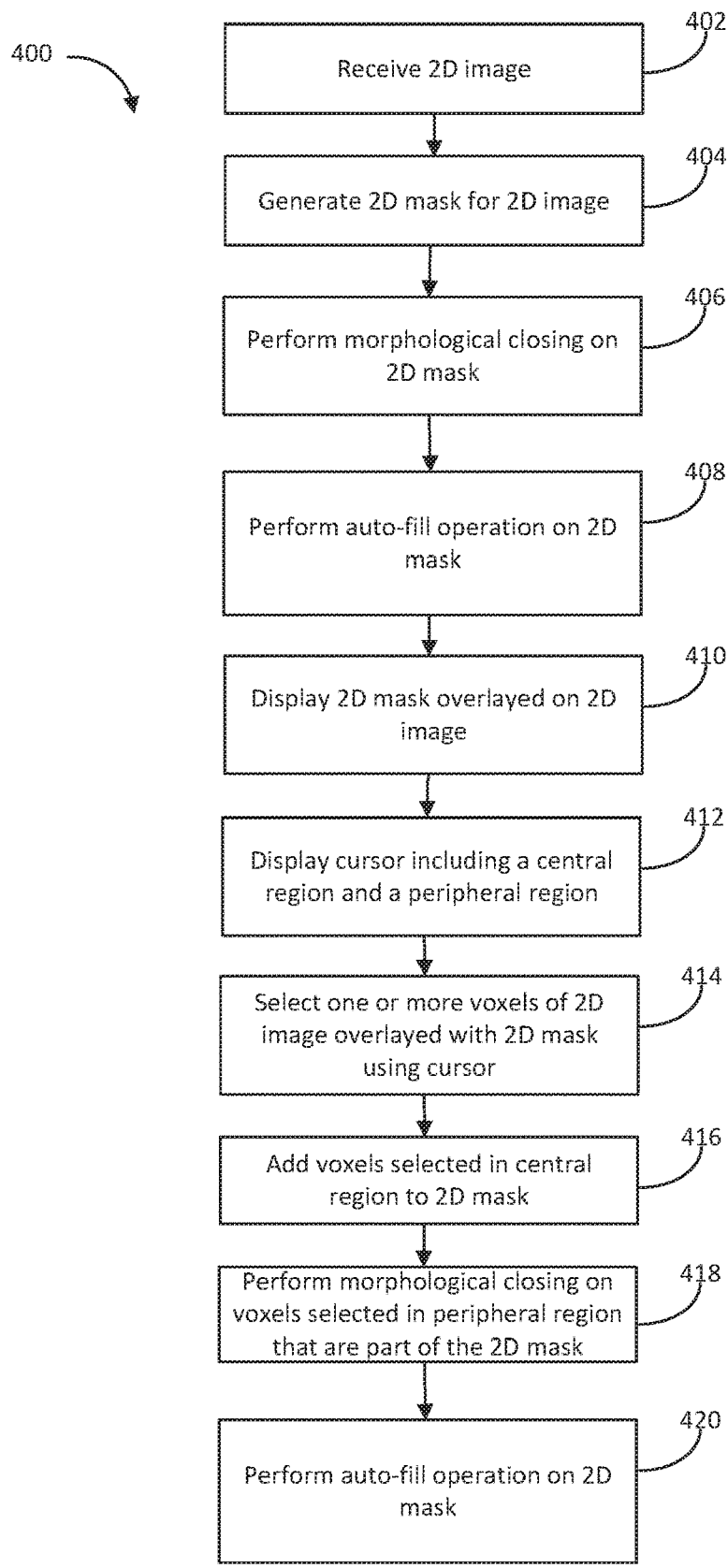
FIG. 4 illustrates an example of a process for segmenting 2D images, in accordance with certain embodiments.

FIG. 4 illustrates an example of a process 400 for segmenting 2D images, in accordance with certain embodiments. Process 400 may be performed by one or more suitable computing devices such as computer 102. Though process 400 is described as being performed in a single plane of the imaged object or on a single 2D image, it should be noted that process 400 (or certain operations of process 400) may be performed on multiple 2D images of a stack of 2D images (e.g., some or all 2D images of a stack of 2D images), similar to process 200.

At 402, the computing device receives one or more 2D images (e.g., a stack of 2D images), such as described with respect to 202. At 404, the computing device generates one or more 2D masks for the one or more 2D images based on a greyscale window defined in the computing device, such as described with respect to 204. At 406, a morphological closing is performed on at least one of the one or more 2D masks, such as described with respect to 206. At 408, the computing device performs an automatic flood-fill operation on at least one of the one or more 2D masks (e.g., the same or different as in operation 406), such as described with respect to 208. In certain embodiments, any of operations 402-408 is optional as a corresponding image/mask for each operation may be obtained (e.g., from another source).

Figure 3C:
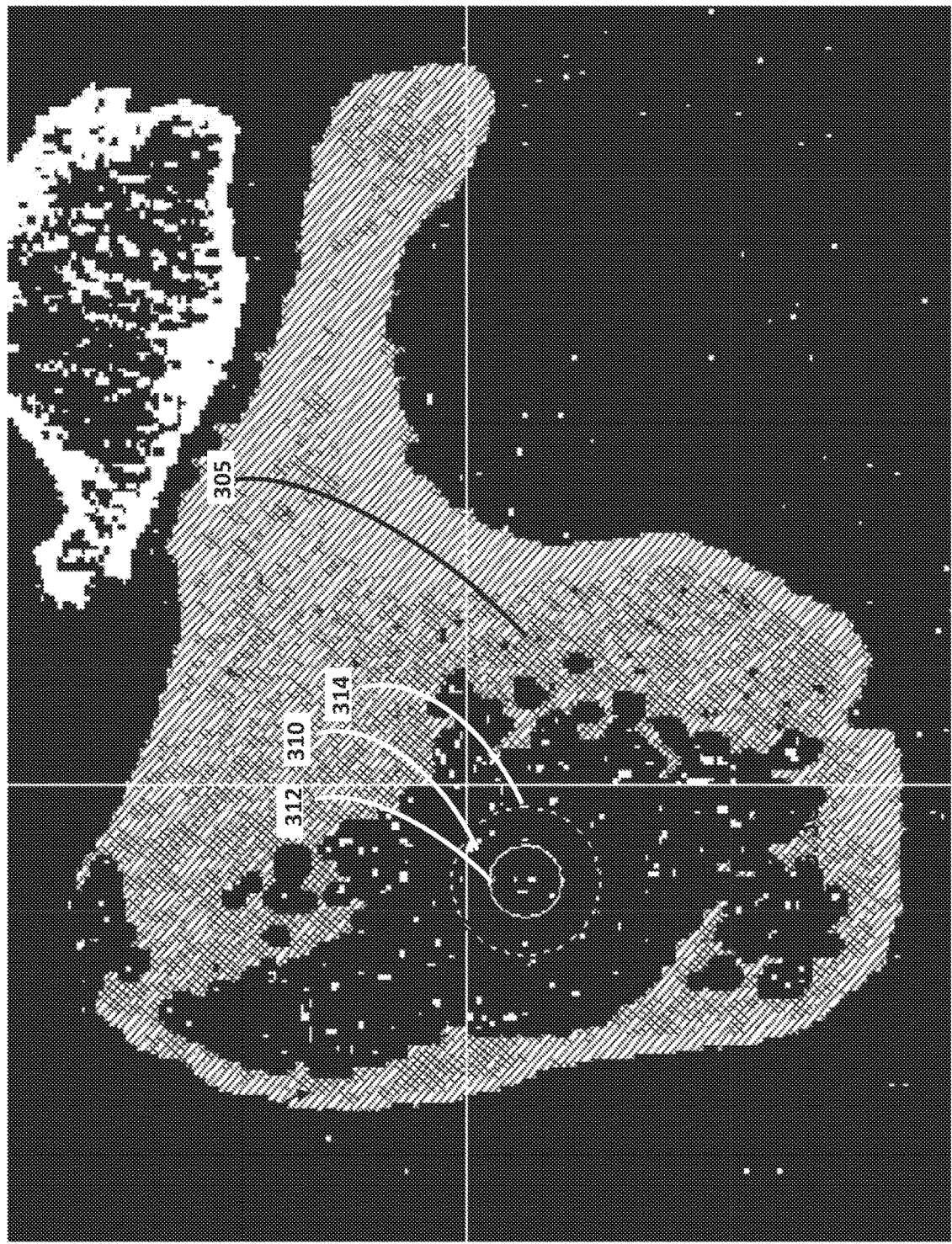

At 410, a visual representation of at least one of the one or more 2D masks overlayed over a corresponding at least one of the one or more 2D images is displayed on a display of the computing device. For example, the pixels of the 2D mask may be colored a different hue than other pixels of the 2D image. At 412, a cursor is displayed on a display of the computing device, the cursor indicating two regions, a central region and a peripheral region. For example, FIG. 3C illustrates an example of a cursor 310 including a central region depicted by the area in circle 312, and a peripheral region depicted by the area in circle 314 including circle 312. It should be noted that, though the central region and peripheral region are shown as circles, they may be any suitable shape or size (e.g., square, rectangle, etc.). Further, though the central region and peripheral region are shown as the same shape, they may be different shapes. Further, though certain aspects are described with respect to a "cursor" it should be noted that other suitable visual representation may be used.

Figure 3D:
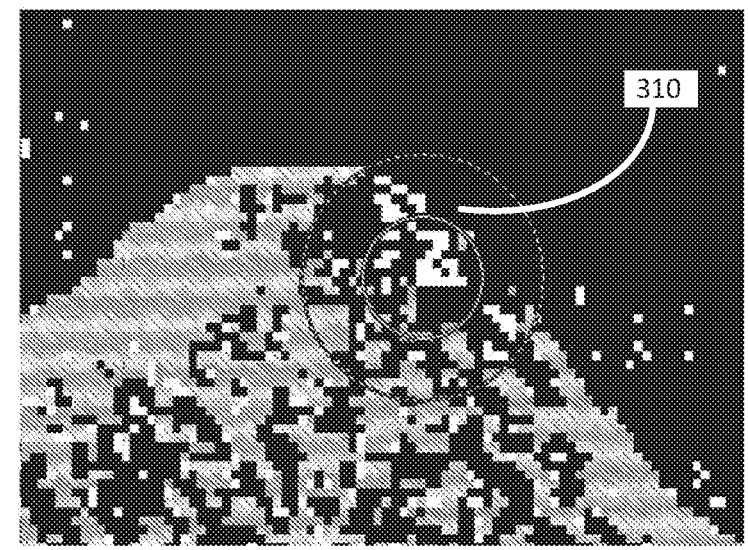

At 414, the user can move the cursor (e.g., using a touch-screen, mouse, or other input device) along the 2D image overlayed with the 2D mask and select (e.g., through a tap, mouse click, click-and-hold, drag, etc.) voxels within the central region and the peripheral region of the cursor. Some voxels may be selected by only the peripheral region, while some voxels may be selected by both the peripheral region and the central region. For example, FIG. 3D illustrates an area of 2D image 300 overlayed with the 2D mask 305 selected using the cursor 310 as shown by the position of the cursor 310. For example, if a user clicks, holds, and drags the cursor 310 over pixels of the 2D image, all the pixels where the central region passes during the action are treated as selected by the central region, and all pixels where the peripheral region passes during the action are treated as selected by the peripheral region.

Figure 3E:
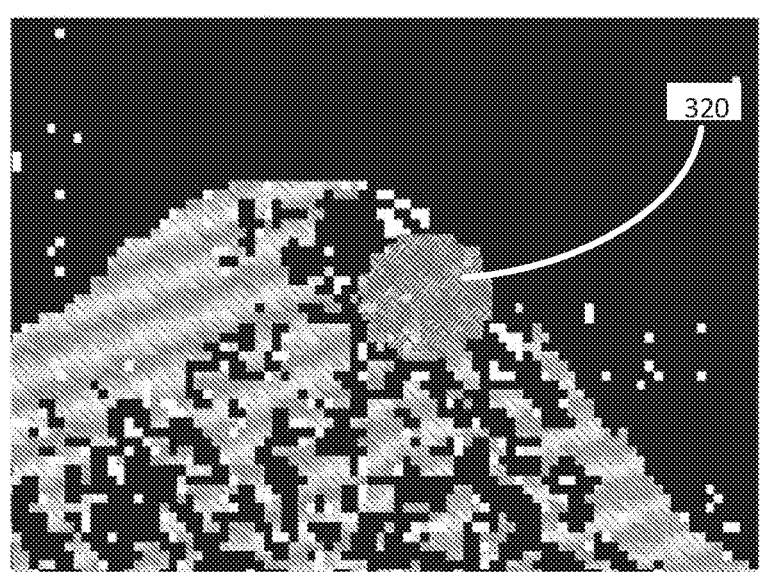
Figure 3F:
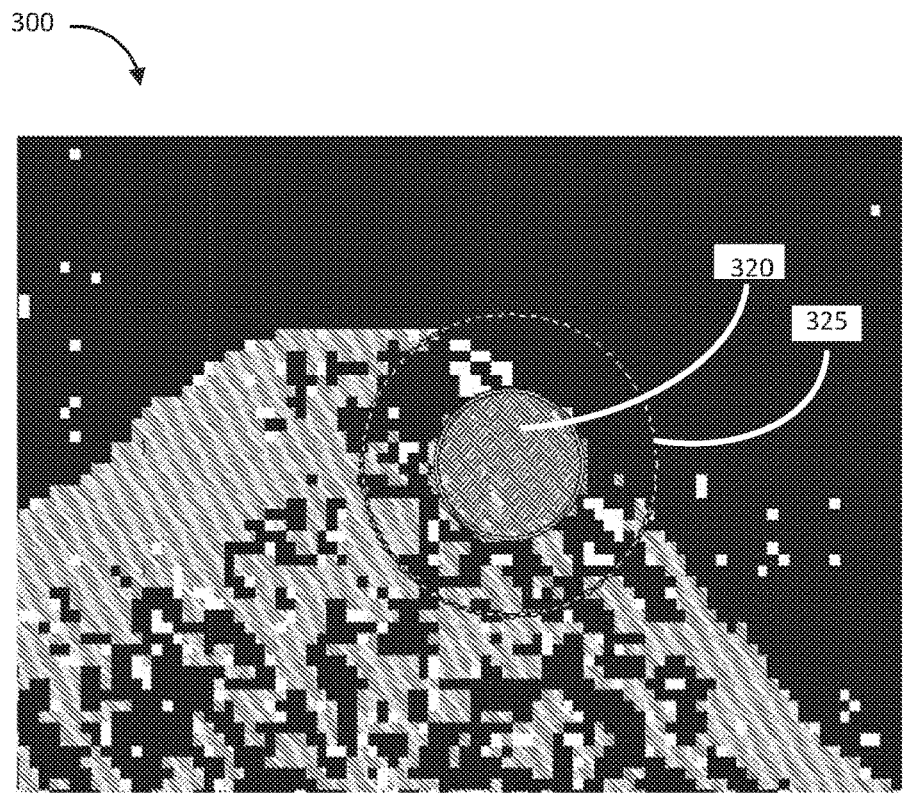
Figure 3G:
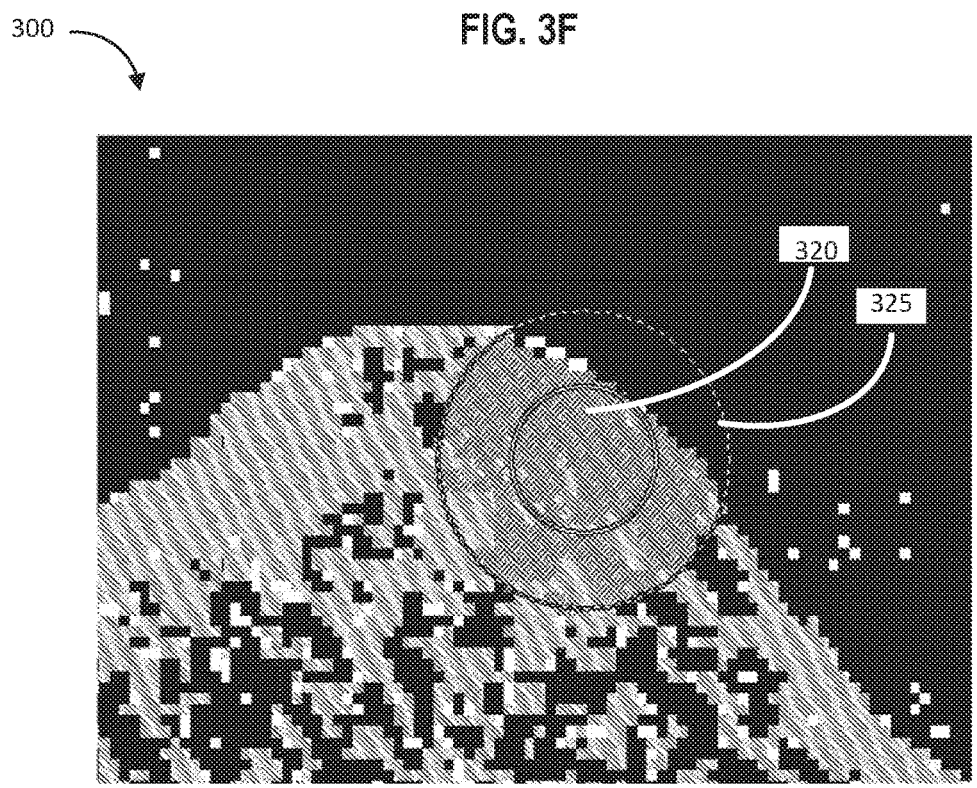
Figure 3H:
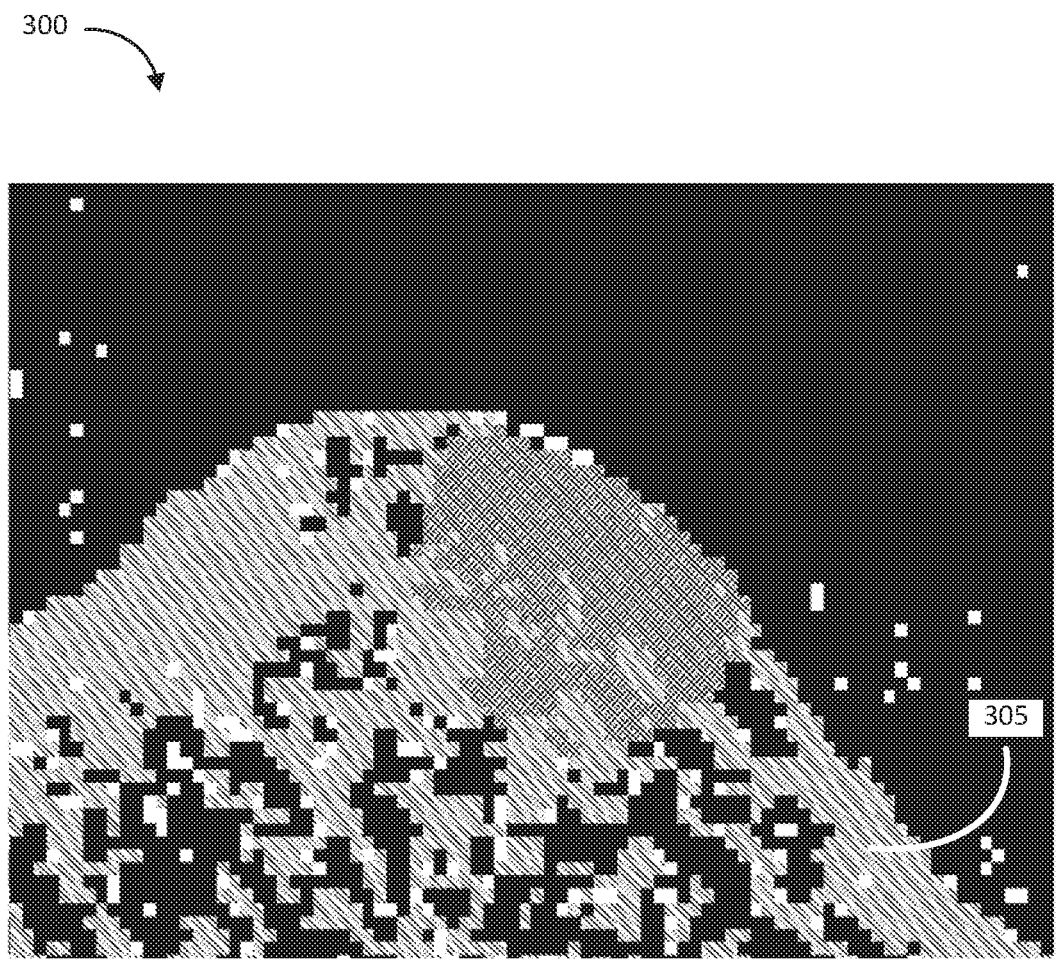

At 416, any voxels in the 2D image selected as part of the central region not already part of the 2D mask may be added to the corresponding 2D mask by the computing device. For example, FIG. 3E illustrates an area 320 of the 2D image 300 added to 2D mask 305. At 418, for any voxels part of the 2D mask selected as part of the peripheral region, (e.g., including the voxels of area 320), a morphological closing is performed by the computing device. For example, FIG. 3F illustrates an area 325 of the 2D image 300 overlayed with the 2D mask 305 selected as part of the peripheral region and FIG. 3G illustrates the resulting addition to 2D mask 305 based on the morphological closing. The morphological closing thereby adds voxels to the 2D mask to fill in the gaps between voxels already part of the 2D mask that are less than a given number of voxels apart. At 420, another automatic flood-fill operation is performed on the 2D mask to fill any closed cavities that were previously open cavities. For example, FIG. 3H illustrates 2D mask 305 after the morphological closing and automatic flood-fill of operations 418 and 420. In certain embodiments, the automatic flood-fill operation may be limited to any voxels in the area selected as part of the peripheral region. In certain such embodiments, the automatic flood-fill operation is performed on the area for the entire stack of 2D images. In certain embodiments, newly added voxels to the 2D mask (e.g., from the automatic flood-fill operation) may be used as seeds for a local automatic flood fill where all enclosed areas around (e.g., within a threshold number of voxels) the newly added voxels are filled using the automatic flood fill, and any areas around the newly added voxels that go to the edge of the 2D image are ignored.

By limiting the areas in which additional morphological closing and/or automatic flood-fill operations are performed, and limiting the number of times they are performed in process 400 as compared to process 200, the number of computing cycles and computations needed to segment 2D images may be reduced, thereby speeding up the process, reducing power consumption, increasing efficiency, etc.

In certain embodiments, any of operations 416-420 may be performed in 2D as described or in 3D. For example, the central region of the cursor, though shown as a 2D cursor, can instead function as a 3D volume (e.g., a sphere, prismatic shape, etc.) and any voxels across multiple 2D images of the stack within the central region are added to the stacked mask. Similarly, the peripheral region of the cursor, though shown as a 2D cursor, can instead function as a 3D volume (e.g., a sphere, prismatic shape, etc.) and any voxels across multiple 2D images of the stack within the peripheral region may have a 3D morphological closing (i.e., across 2D masks of the stacked mask) performed by the computing device. Further, as an example, the automatic flood-fill operation may be performed in 3D on voxels contained in the entire stack of images. The computing device may be configured to display a user interface to a user to select options including which operations to perform in 2D, which operations to perform in 3D, which 2D images/masks to select, etc.

In certain embodiments, adding voxels within the central region of the cursor is performed in 2D meaning any voxels in the displayed 2D image selected as part of the central region not already part of the 2D mask may be added to the corresponding 2D mask by the computing device. Voxels of other 2D images are not added to the stacked mask. Further, the peripheral region of the cursor, though shown as a 2D cursor, can instead function as a 3D volume (e.g., a sphere, prismatic shape, etc.) and any voxels across multiple 2D images of the stack within the peripheral region may have a 3D morphological closing (i.e., across 2D masks of the stacked mask) performed by the computing device. For example, the 3D volume may be a sphere with the same diameter as the peripheral region of the cursor. Further, the automatic flood-fill operation may be performed across the entire stacked mask. Such an embodiment provides certain advantages. For example, by only allowing voxels visible to the user to be added to the 2D mask using the central region, no voxels unknown to the user are accidentally added to the stacked mask. Further, performing the morphological closing in 3D allows the effect of added pixels to extend to neighboring 2D masks, reducing the number of individual 2D masks that need to be edited by the user. However, by not performing the morphological closing on the entire stack, computational savings are achieved. The automatic flood-fill may be a fast enough operation to run on the entire stack.

Figure 5:
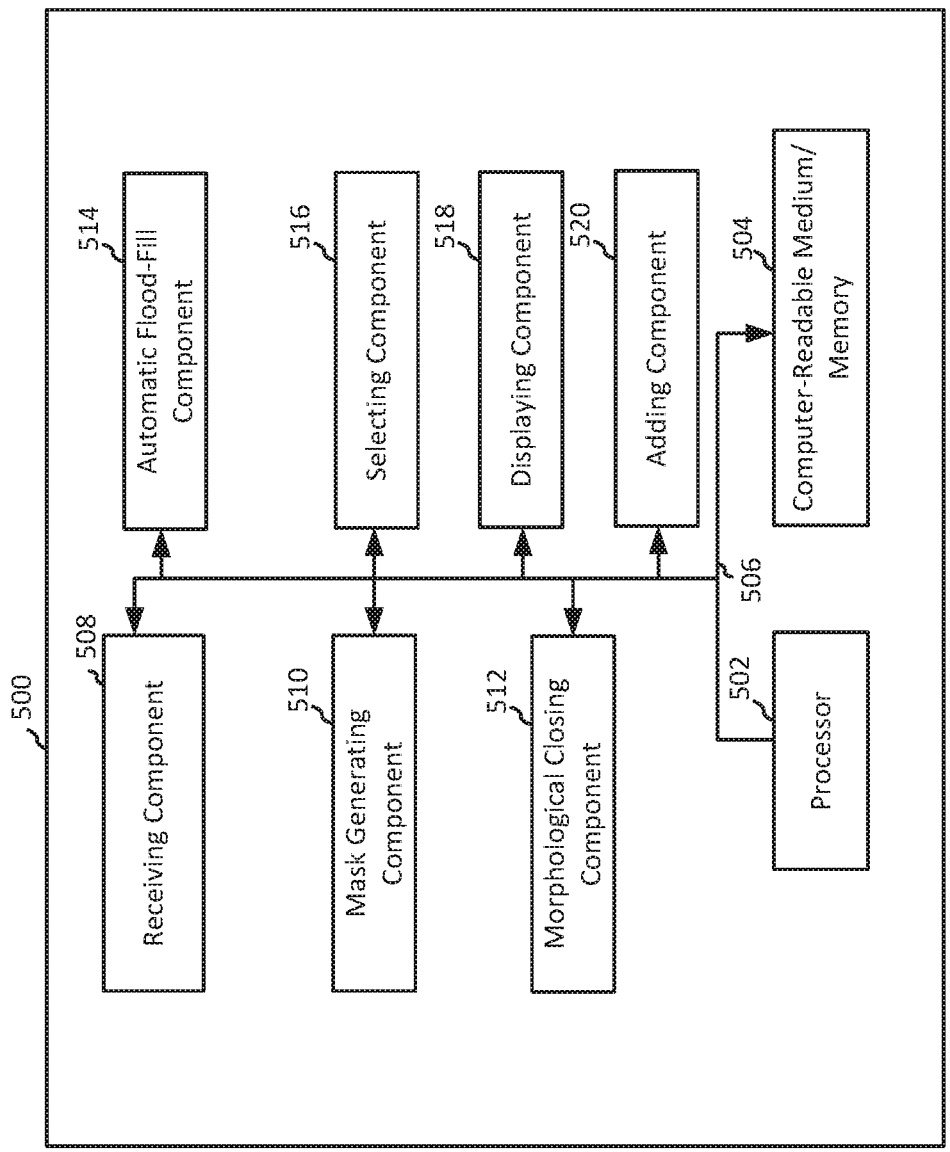
FIG. 5 illustrates a computing device that may include various components configured to perform operations for the techniques disclosed herein, such as the operations illustrated in FIGS. 2 and/or 4.

FIG. 5 illustrates a computing device 500 that may include various components (e.g., corresponding to means-plus-function components) configured to perform operations for the techniques disclosed herein, such as the operations illustrated in FIGS. 2 and/or 4. The computing device 500 includes a processor 502 coupled to a non-transitory computer-readable medium/memory 504 via a bus 506. In certain aspects, the computer-readable medium/memory 504 is configured to store instructions that when executed by processor 502, cause the processor 502 to perform the operations illustrated in FIGS. 2 and/or 4, or other operations for performing the various techniques discussed herein.

In certain aspects, the computing device 500 further includes a receiving component 508 for performing the operations illustrated at 202 in FIG. 2 and/or 402 in FIG. 4. Additionally, the computing device 500 includes a mask generating 510 for performing the operations illustrated at 204 in FIG. 2 and/or 404 in FIG. 4. The computing device 500 also includes a morphological closing component 512 for performing the operations illustrated at 206 in FIGS. 2, 418, and/or 406 in FIG. 4. The computing device 500 also includes an automatic flood-fill component 514 for performing the operations illustrated at 208 in FIGS. 2, 420, and/or 408 in FIG. 4. The computing device 500 also includes a selecting component 516 for performing the operations illustrated at 210 in FIG. 2 and/or 414 in FIG. 4. The computing device 500 also includes a displaying component 518 for performing the operations illustrated at 410 and/or 412 in FIG. 4. The computing device 500 also includes an adding component 520 for performing the operations illustrated at 210 in FIG. 2 and/or 416 in FIG. 4.

The components 508-520 may be coupled to the processor 502 via bus 506. In certain embodiments, the components 508-520 may be hardware circuits. In certain embodiments, the components 508-520 may be software components that are executed and run on processor 502.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Various embodiments disclosed herein provide for the use of a computer system to perform segmenting of 2D images. A skilled artisan will readily appreciate that these embodiments may be implemented using numerous different types of computing devices, including both general-purpose and/or special-purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general-purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special-purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method of segmenting a 2D image, the method comprising:
    obtaining a 2D mask for the 2D image, wherein the 2D mask comprises a portion of the 2D image;
    selecting one or more first voxels of the 2D image that are part of the 2D mask;
    upon selecting the one or more first voxels, performing a morphological closing on one or more second voxels comprising the one or more first voxels of the 2D image that are part of the 2D mask; and
    performing an automatic flood-fill operation on at least a portion of the 2D mask after performing the morphological closing on the one or more second voxels.

2. The method of claim 1, further comprising adding one or more third voxels of the 2D image to the 2D mask, wherein the one or more first voxels include the one or more third voxels and additional voxels.

3. The method of claim 1, further comprising selecting one or more third voxels not part of the 2D mask and adding the one or more third voxels of the 2D image to the 2D mask, wherein the selecting the one or more first voxels and the one or more third voxels is performed using a cursor comprising a first region and a second region, wherein voxels selected in the first region are the one or more third voxels, and voxels selected in the second region are the one or more first voxels.

4. The method of claim 1, further comprising:
    adding one or more third voxels of the 2D image to the 2D mask prior to performing the morphological closing on the one or more second voxels; and
    prior to selecting the one or more first voxels and adding the one or more third voxels to the 2D mask:
        performing another morphological closing on the 2D mask; and
        performing another automatic flood-fill operation on at least a portion of the 2D mask.

5. The method of claim 1, wherein obtaining the 2D mask comprises selecting voxels of the 2D image within a greyscale window.

6. The method of claim 1, further comprising receiving the 2D image.

7. The method of claim 1, wherein the 2D image is one of a plurality of 2D images forming a stack, the plurality of 2D images corresponding to a 3D representation of an object.

8. The method of claim 7, wherein obtaining the 2D mask comprises obtaining a plurality of 2D masks for multiple of the plurality of 2D images.

9. The method of claim 8, wherein selecting the one or more first voxels further comprises selecting voxels across multiple of the 2D masks using a cursor comprising a first region and a second region.

10. The method of claim 9, wherein voxels selected in the second region include the one or more first voxels, and wherein performing the morphological closing comprises performing a 3D morphological closing on voxels selected in the second region that are part of the 2D mask.

11. The method of claim 9, wherein voxels selected in the second region include the one or more first voxels, and wherein performing the auto-fill operation comprises performing a 3D automatic flood-fill operation on voxels selected in the second region that are part of the 2D mask.

12. The method of claim 9, wherein performing the automatic flood-fill operation comprises performing a 3D automatic flood-fill operation on the entire stack.

13. A non-transitory computer readable medium having instructions stored thereon that when executed by a computing device cause the computing device to:
    obtain a 2D mask for the 2D image, wherein the 2D mask comprises a portion of the 2D image;
    select one or more first voxels of the 2D image that are part of the 2D mask;
    upon selecting the one or more first voxels, perform a morphological closing on one or more second voxels comprising the one or more first voxels of the 2D image that are part of the 2D mask; and
    perform an automatic flood-fill operation on at least a portion of the 2D mask after performing the morphological closing on the one or more second voxels.

14. The non-transitory computer readable medium of claim 13, wherein the instructions when executed by the computing device further cause the computing device to add one or more third voxels of the 2D image to the 2D mask, wherein the one or more first voxels include the one or more third voxels and additional voxels.

15. The non-transitory computer readable medium of claim 13, wherein the instructions when executed by the computing device further cause the computing device to select one or more third voxels not part of the 2D mask and add the one or more third voxels of the 2D image to the 2D mask, wherein the selecting the one or more first voxels and the one or more third voxels is performed using a cursor comprising a first region and a second region, wherein voxels selected in the first region are the one or more third voxels, and voxels selected in the second region are the one or more first voxels.

16. The non-transitory computer readable medium of claim 13, wherein the instructions when executed by the computing device further cause the computing device to:
    add one or more third voxels of the 2D image to the 2D mask prior to performing the morphological closing on the one or more second voxels; and
    prior to selecting the one or more first voxels and adding the one or more third voxels to the 2D mask:
        perform another morphological closing on the 2D mask; and
        perform another automatic flood-fill operation on at least a portion of the 2D mask.

17. A computing device comprising:
    a memory; and
    a processor coupled to the memory, the processor and the memory being configured to:
        obtain a 2D mask for the 2D image, wherein the 2D mask comprises a portion of the 2D image;

select one or more first voxels of the 2D image that are part of the 2D mask;

upon selecting the one or more first voxels, perform a morphological closing on one or more second voxels comprising the one or more first voxels of the 2D image that are part of the 2D mask; and perform an automatic flood-fill operation on at least a portion of the 2D mask after performing the morphological closing on the one or more second voxels.

18. The computing device of claim 17, wherein the processor and the memory are further configured to add one or more third voxels of the 2D image to the 2D mask, wherein the one or more first voxels include the one or more third voxels and additional voxels.

19. The computing device of claim 17, wherein the processor and the memory are further configured to select one or more third voxels not part of the 2D mask and add the one or more third voxels of the 2D image to the 2D mask, wherein the selecting the one or more first voxels and the one or more third voxels is performed using a cursor comprising a first region and a second region, wherein voxels selected in the first region are the one or more third voxels, and voxels selected in the second region are the one or more first voxels.

20. The computing device of claim 17, wherein the processor and the memory are further configured to:

add one or more third voxels of the 2D image to the 2D mask prior to performing the morphological closing on the one or more second voxels; and prior to selecting the one or more first voxels and adding the one or more third voxels to the 2D mask:

perform another morphological closing on the 2D mask; and perform another automatic flood-fill operation on at least a portion of the 2D mask.

* * * * *